F. W. KREMER.
ANTISKID TIRE.
APPLICATION FILED APR. 27, 1912.
1,078,098.
Patented Nov. 11, 1913.
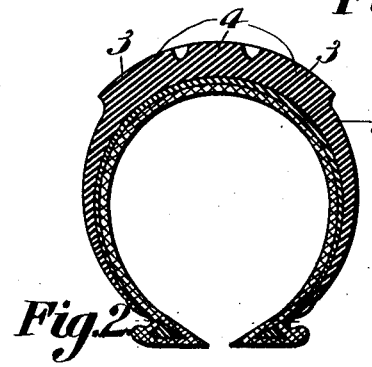
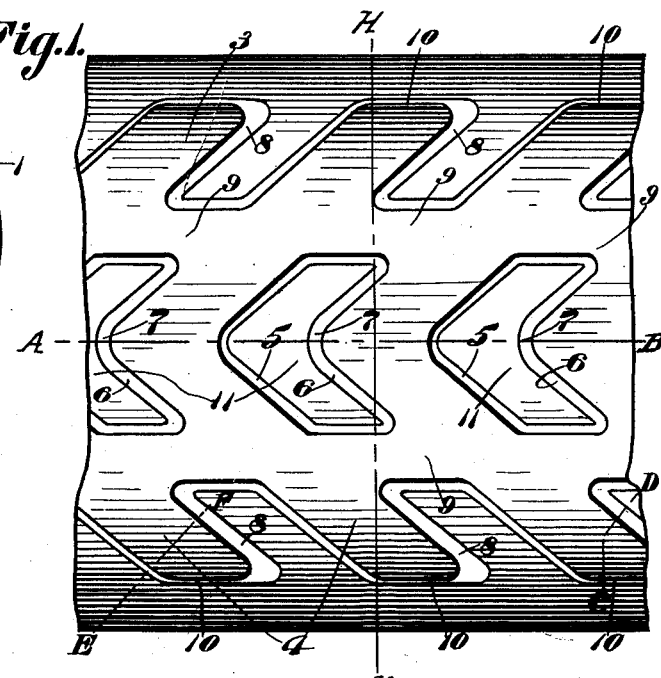
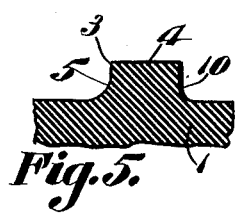
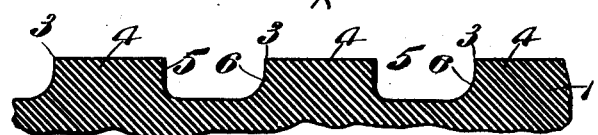
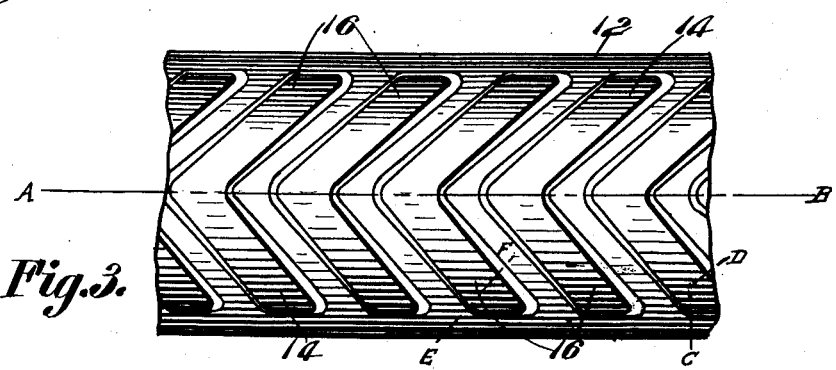
Witnesses
Franklin W. Kremer,
Inventor
by C. A. Snow & Co.
Attorneys

UNITED STATES PATENT OFFICE.

FRANKLIN W. KREMER, OF CARLSTADT, NEW JERSEY.

ANTISKID-TIRE.

1,078,098.  Specification of Letters Patent.  Patented Nov. 11, 1913.

Application filed April 27, 1912. Serial No. 693,609.

*To all whom it may concern:*

Be it known that I, FRANKLIN W. KREMER, a citizen of the United States, residing at Carlstadt, in the county of Bergen and State of New Jersey, have invented a new and useful Antiskid-Tire, of which the following is a specification.

One object of the present invention is to provide a tire member having anti-skidding parts the constituent elements of which coöperate to prevent a lateral strain upon the member due to the drive.

A further object of the invention is to provide a tire member having anti-skidding parts the constituent elements of which reinforce each other to resist the skidding strain.

The invention aims to provide a tire member having anti-skidding parts one of the constituent elements of which acts as a skid-retarding element, the other of the constituent elements of which acts as a skid-directing element coöperating with the skid-retarding element.
Another object of the invention is to provide a tire member having anti-skidding parts which coöperate to avoid a jar.

A further object of the invention is to provide a tire member having an anti-skidding part reinforced in a novel manner to resist the initial strain and the final strain imposed thereon by contact with the ground.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a plan of one form of the invention; Fig. 2 is a transverse section taken on the line H—K of the structure shown in Fig. 1; Fig. 3 is a plan of a modified form of the invention; Fig. 4 is a section upon the line A—B of Figs. 1 and 3; Fig. 5 is a section upon the line C—D of Figs. 1 and 3; and Fig. 6 is a section upon the line E—F of Figs. 1 and 3.

In carrying out the invention, a tire member 1 is provided, the same preferably being fashioned from a good grade of rubber.
The tire member 1 is provided with a plurality of continuous, V-shaped tread ribs 3, constituting anti-skidding parts, the apices of the tread ribs 3 preferably lying in the median plane of the tire member, the arms 4 of the ribs 3 converging in a common direction in successive ribs. The arms 4 of each rib are alined transversely of the tire member 1. The apex of one rib 3 is extended across a line connecting the ends of the arms 4 of an adjacent rib. Owing to the angular relation of the arms 4, one arm constitutes a skid-retarding element, and the other arm 4 constitutes a coöperating skid-directing element. One arm 4, moreover, serves as a reinforcement for the other arm 4 to resist the skidding strain.

The interior faces 5 and the exterior faces 6 of the arms 4 of the ribs 3 slant in opposite directions longitudinally of the tire member 1. The interior faces 5 have a maximum pitch adjacent the apices of the ribs 3, that is, the faces 5, at the apices of the ribs approach parallelism with a line at right angles to the tire member 1. The exterior faces 6 of the ribs 3 have a minimum pitch adjacent the apices of the ribs. Owing to the constructions last above pointed out, the rib 3 will be reinforced, as indicated at 7, at its apex and upon its exterior face and the arms 4 of the ribs 3 will be reinforced as indicated at 8, upon their interior faces and adjacent their ends.

If desired, as shown in Fig. 1, the arms 4 of successive ribs 3 may be united by longitudinal connections 9, coöperating with the arms 4 to form vacuum chambers 11 along the longitudinal center of the tire member 1. These vacuum chambers 11 are so constructed that when their hold upon the ground is broken, there will be no throwing of the dust and mud as the wheel rotates. This result is brought about by fashioning the chambers in such a manner that they will be vented gradually, as contrasted with an abrupt breaking of the vacuum hold upon the ground.

It is to be noted that the converging interior faces 5 of the arms 4 serve to define a reduced, venting extension at one end of each chamber 11. As the wheel rotates, the venting extension will permit the entrance of air into the chamber 11 before the remaining portions of the chamber are lifted free from contact with the ground by the rotation of the wheel. As a consequence, the vacuum chamber 11 is not torn abruptly from contact with the ground and the chamber does not suck up and whirl away the mud and dust.

The end faces 10 of the arms 4 lie in a common plane, parallel to the median plane of the tire member 1. The faces 10 together with the faces 5 define more abrupt angles with respect to the tread surfaces of the ribs 3 than do the faces 6.

The tire members 1 are so applied to the rear, power-driven wheels of the vehicle that when the ribs 3 are in contact with the ground, the apices of the ribs are rearwardly disposed. Since the forward wheels are driven by contact with the ground, the tire members 1 are applied to the forward wheels in such a manner that the apices of the ribs 3 will be forwardly disposed. Therefore, when the wheels are driven, either through the medium of a prime mover or through contact with the ground, the arms 4 of the tread ribs 3 will be forced toward the longitudinal center of the tire member 1. Owing to this construction, the tire member 1 will not be subjected to a lateral, expansive strain tending to separate the tire member upon opposite sides of the median plane of the wheel. This feature is notably important at the inception of the drive, it being at this time that the strain upon the tire member, tending to tear the same apart laterally, is greatest.

When the wheel is rotated, the apex of the rib 3 first comes into contact with the ground, the initial driving strain upon the rib being greatest at the apex. It is to obviate damage due to this strain that the reinforcement denoted by the numeral 7 is provided. The extremities of the arms 4 are the portions of the ribs last to break contact with the ground. To reinforce the ribs against this final strain, the reinforcement indicated at 8 is provided.

Since the apex of each rib 3 projects across a line connecting the ends of the arms 4 of an adjoining rib, the apex of one rib will come into contact with the ground before the ends of the arms of an adjoining rib break contact with the ground. Thus, a smooth and evenly running structure is provided, the jar incident to the shifting of the contact from rib to rib, being reduced to a minimum.

When the wheel skids, one of the arms 4 will act as a skid-directing element, the other arm 4 acting as a skid-retarding element. Each arm 4 serves to reinforce its fellow to withstand the skidding strain, and this reinforcement is notably apparent in that form of the invention which is shown in Fig. 1, wherein the connections 10 are employed.

That form of the invention which appears in Fig. 3 comprises a tire member 12 and ribs 14, each comprising as before, continuous, diverging arms 16, the structure shown in Fig. 3 being a duplicate of that shown in Fig. 1, saving that in Fig. 3 the connections 9 are omitted.

Having thus described the invention, what is claimed is:—

1. In a device of the class described, a tire member having continuous, V-shaped ribs provided with oppositely slanting interior and exterior faces, the interior faces having a maximum pitch adjacent the apex of the rib, the external faces having a minimum pitch adjacent the apex of the rib.

2. A tire having approximately V-shaped ribs on the tread thereof, and longitudinal ribs on opposite sides of the median line of the tread and connecting the V-shaped ribs at points about midway between their apices and their outer ends, said ribs serving to define vacuum chambers at the center of the tread, said chambers having V-shaped forward and rear walls and inclined venting extensions.

3. A tire having vacuum chambers along the median line of the tread and arranged within the normal bearing surface of the tire, said chambers having V-shaped forward and rear walls arranged in parallelism with each other, and forming inclined venting extensions for said chambers, said V-shaped walls having their apices at substantially the median line of the tread.

4. A tire having vacuum chambers along the median line of the tread and arranged within the normal bearing surface of the tire, said chambers having V-shaped forward and rear walls arranged in parallelism with each other, and forming inclined venting extensions for said chambers, said V-shaped walls having their apices at substantially the median line of the tread, the outer walls of the vacuum chambers being parallel with the median line of the tread.

In testimony that I claim the foregoing as my own, I have hereto affixed my signature in the presence of two witnesses.

FRANKLIN W. KREMER.

Witnesses:
SELINA WILLSON,
RUTH SCOTT.